United States Patent
Dudar

(10) Patent No.: US 11,480,138 B1
(45) Date of Patent: Oct. 25, 2022

(54) EVAPORATIVE-EMISSIONS SYSTEM WITH AUXILIARY SUBSYSTEM FOR EXTERNAL FUEL-STORAGE DEVICE

(71) Applicant: FORD GLOBAL TECHNOLOGIES, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/240,244

(22) Filed: Apr. 26, 2021

(51) Int. Cl.
*F02M 33/02* (2006.01)
*F02M 25/08* (2006.01)
*F02M 35/10* (2006.01)
*B60K 15/05* (2006.01)
*B01D 53/04* (2006.01)

(52) U.S. Cl.
CPC ......... *F02M 25/0836* (2013.01); *B01D 53/04* (2013.01); *B60K 15/05* (2013.01); *F02M 35/10222* (2013.01); *B01D 2253/102* (2013.01); *B01D 2257/702* (2013.01); *B01D 2259/402* (2013.01); *B01D 2259/40088* (2013.01); *B01D 2259/4516* (2013.01)

(58) Field of Classification Search
CPC . F02M 25/08; F02M 33/02; F02M 2025/0863
USPC ........................ 123/516, 518, 520
See application file for complete search history.

(56) References Cited

U.S. PATENT DOCUMENTS

| | | | |
|---|---|---|---|
| 6,360,729 B1* | 3/2002 | Ellsworth | B60K 15/03 123/518 |
| 10,378,486 B2 | 8/2019 | Dudar | |
| 10,940,854 B2 | 3/2021 | Dudar | |
| 2003/0221675 A1* | 12/2003 | Washeleski | F02D 41/0032 123/497 |
| 2008/0308075 A1 | 12/2008 | Allen et al. | |
| 2009/0025805 A1* | 1/2009 | Makino | B60K 15/00 137/587 |
| 2017/0226967 A1* | 8/2017 | Dudar | B60K 15/035 |
| 2019/0360380 A1* | 11/2019 | Dudar | F01P 7/14 |
| 2019/0383239 A1* | 12/2019 | Dudar | F02M 25/0836 |
| 2020/0172088 A1 | 4/2020 | Dudar | |

* cited by examiner

*Primary Examiner* — John Kwon
(74) *Attorney, Agent, or Firm* — Vincent Mastrogiacomo; Brooks Kushman P.C.

(57) ABSTRACT

A vehicle includes a fuel tank and an evaporative-emissions system having a primary subsystem and an auxiliary subsystem. The primary subsystem has a fuel-vapor canister in fluid communication with the fuel tank to capture fuel vapors of the fuel tank. The auxiliary subsystem is configured to capture fuel vapors associated with an external fuel-storage device. The auxiliary subsystem has an auxiliary port located on an exterior of the vehicle and is configured to connect with the external fuel-storage device. The auxiliary port is selectively connected in fluid communication with the fuel-vapor canister by a valve.

20 Claims, 3 Drawing Sheets

EVAPORATIVE-EMISSIONS SYSTEM WITH AUXILIARY SUBSYSTEM FOR EXTERNAL FUEL-STORAGE DEVICE

TECHNICAL FIELD

This disclosure relates to evaporative-emission systems and more particularly to evaporative-emission systems having auxiliary subsystems for external fuel-storage devices or the like.

BACKGROUND

A vehicle may include an evaporative-emissions system configured to store refueling vapors, running-loss vapors, and diurnal emissions in a fuel-vapor canister. The canister is periodically purged by routing the stored vapors to the engine intake manifold for combustion. In a typical canister purge operation, a canister purge valve coupled between the engine intake manifold and the fuel-vapor canister is opened so that intake manifold vacuum draws fuel vapor from the canister. Fresh air may be provided to the fuel-vapor canister via a vent circuit. The canister typically includes an adsorbent material.

SUMMARY

According to one embodiment, a vehicle includes a fuel tank and an evaporative-emissions system having a primary subsystem and an auxiliary subsystem. The primary subsystem has a fuel-vapor canister in fluid communication with the fuel tank to capture fuel vapors of the fuel tank. The auxiliary subsystem is configured to capture fuel vapors associated with an external fuel-storage device. The auxiliary subsystem has an auxiliary port located on an exterior of the vehicle and is configured to connect with the external fuel-storage device. The auxiliary port is selectively connected in fluid communication with the fuel-vapor canister by a valve.

According to another embodiment, a vehicle includes an engine having an intake manifold and a fuel-vapor canister configured to store fuel vapors. A purge line connects the canister in fluid communication with the intake manifold, and a vent line connects the canister in fluid communication with the atmosphere. An auxiliary port is configured to connect to an external fuel-storage device. The auxiliary line connects the auxiliary port in fluid communication with the canister and includes an associated valve having a first position in which the line is open to connect the port to the canister and a second position in which the line is closed to sever fluid communication between the port and the canister.

According to yet another embodiment, an evaporative-emissions system of a vehicle includes a fuel-vapor canister configured to store fuel vapors. The fuel-vapor canister is selectively connected in fluid communication with an engine intake manifold by a purge line and is selectively connected in fluid communication with the atmosphere by a vent line. an auxiliary port is configured to connect to an external fuel-storage device. The auxiliary port is selectively connected in fluid communication with the fuel-vapor canister by a valve.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
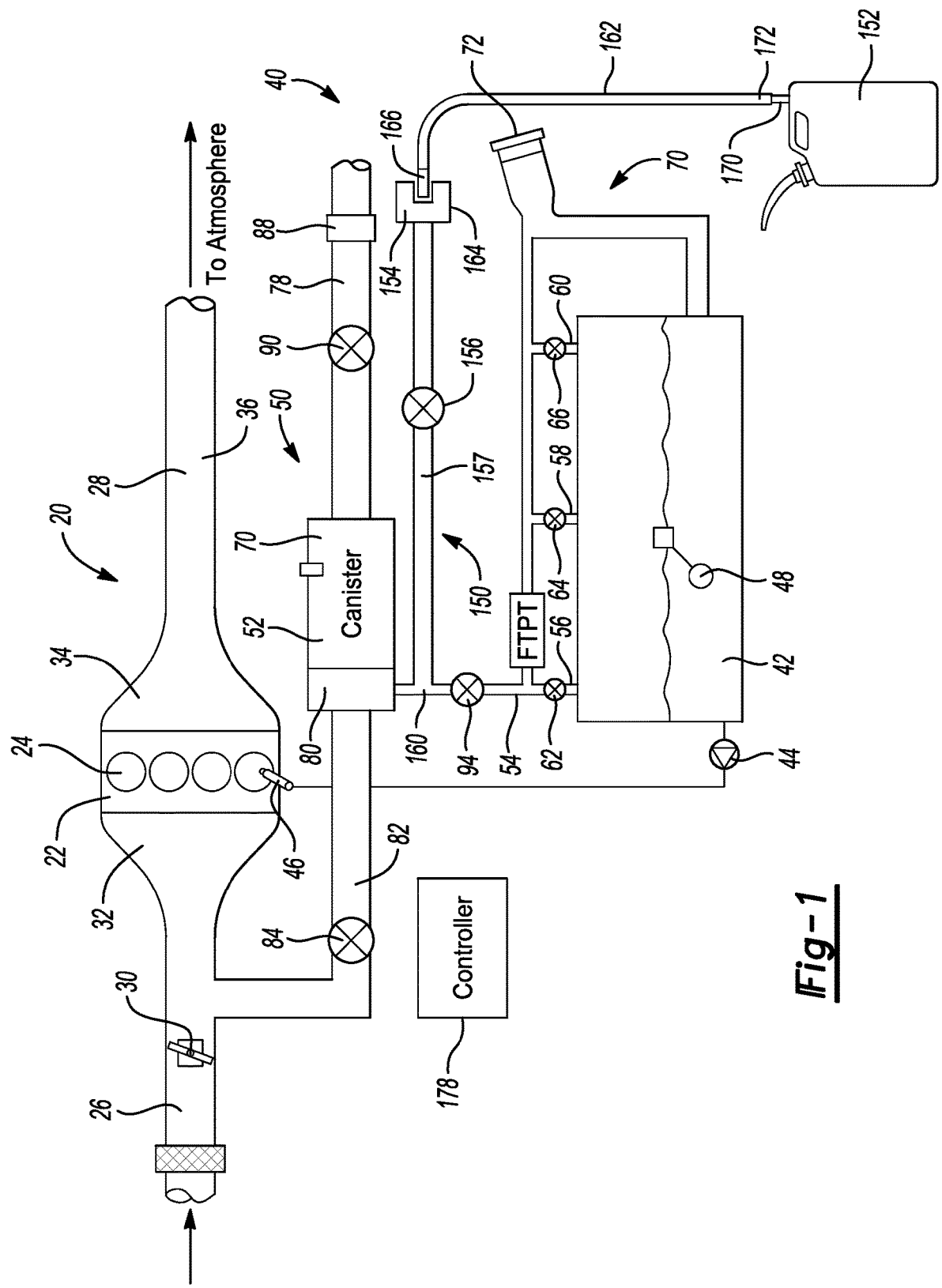
FIG. 1 is a schematic diagram of a vehicle showing an engine system, a fuel system, and an evaporative-emissions system.

Referring to FIG. 1 a vehicle 20 includes an engine 22 having a plurality of cylinders 24. While not explicitly shown, it may be understood that each cylinder may include one or more intake valve(s) and one or more exhaust valve(s). The engine 22 includes an engine air intake 26 and an engine exhaust system 28. The engine air intake 26 includes a throttle 30 in fluid communication with an engine intake manifold 32 via an intake passage. Further, the intake 26 may include an air box having a filter positioned upstream of throttle 30. The engine exhaust system 28 includes an exhaust manifold 34 leading to an exhaust pipe 36 that routes exhaust gas to the atmosphere. It will be appreciated that many additional components may be included in the engine system.

A fuel system 40 may include a fuel tank 42 coupled to a fuel pump system. The fuel pump system may include one or more pumps 44 for pressurizing fuel delivered to the injectors of engine 22, such as the example injector 46, as shown. While only a single injector is shown, additional injectors are provided for each cylinder. A fuel level sensor 48 located in fuel tank 42 may provide an indication of the fuel level. As depicted, fuel level sensor 48 may include a float connected to a variable resistor. Alternatively, other types of fuel level sensors may be used.

Vapors generated in fuel system 40 may be routed to an evaporative-emissions system 50 that includes a fuel-vapor canister 52. The canister is connected to the fuel vapor recovery line 54 that couples to fuel tank 42 via one or more conduit and may include one or more valves for isolating the fuel tank during certain conditions. For example, the vapor recovery line 54 may be coupled to fuel tank 42 via one or more or a combination of conduits 56, 58 and 60.

In some examples, one or more fuel tank vent valves may be positioned in conduits 56, 58, or 60. The fuel tank vent valves may allow the fuel-vapor canister 52 to be maintained at a low pressure or vacuum without increasing the fuel evaporation rate from the tank. For example, conduit 56 may include a grade vent valve (GVV) 62, conduit 58 may include a fill limit venting valve (FLVV) 64, and conduit 60 may include a grade vent valve (GVV) 66. The recovery line 54 may also be coupled to a fuel filler system 70. In some examples, the fuel filler system may include a fuel cap 72 or may be a capless design. The fuel filler system may be partially located within an external compartment hidden under a refueling door that is pivotally connected to the vehicle body.

The Emissions control system 83 may include one or more emissions control devices, such as one or more of the fuel-vapor canisters 52 maybe filled with an appropriate adsorbent 76. The canister 52 is configured to temporarily trap fuel vapors (including vaporized hydrocarbons) during refilling operations and "running loss" (that is, fuel vaporized during vehicle operation, provided the fuel tank is coupled to the canister under such conditions). In one example, the adsorbent 76 is activated charcoal. A canister ventilation path or vent line 78 may route gases out of the canister 222 to the atmosphere when storing, or trapping, fuel vapors from fuel system 40.

The canister 52 may include a buffer 80 a (or buffer region) that includes an adsorbent. As shown, the volume of buffer 80 is smaller than the volume of canister 52. The adsorbent in the buffer 80 a may be the same as, or different than, the adsorbent in the canister (e.g., both may include charcoal) the buffer 80 a may be positioned within the canister 52 such that during canister loading, fuel tank vapors are first adsorbed within the buffer, and then when the buffer is saturated, further fuel tank vapors are adsorbed in the canister. During canister purging, fuel vapors are first desorbed from the canister 52 (e.g., to a threshold amount) before being desorbed from the buffer 80. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors may be coupled to and/or within the canister 52. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

The vent line 78 allows fresh air to be drawn into the canister 52 when purging stored fuel vapors from fuel system 40 to the engine intake 26 via purge line 82 and purge valve 84. For example, the purge valve 84 may be normally closed but may be opened during certain conditions so that vacuum from engine intake manifold 32 is provided to the fuel-vapor canister 52 for purging. In some examples, vent line 78 may include an air filter 88 disposed therein upstream of the canister 52.

In some examples, the flow of air and vapors between the canister 52 and the atmosphere may be regulated by a vent valve 90 coupled within vent line 78. When included, the vent valve 90 may be a normally open valve, so that fuel tank isolation valve 94 (FTIV) may control venting of fuel tank 42 with the atmosphere. FTIV 94 may be positioned between the fuel tank 42 and the fuel-vapor canister 52 within conduit 54. FTIV 94 may be a normally closed valve, that when opened, allows for the venting of fuel vapors from fuel tank 42 to fuel-vapor canister 52. Fuel vapors may then be vented to atmosphere, or purged to engine intake system 26 via canister purge valve 84. In some examples the FTIV may not be included.

The above-described portions of the evaporative-emission system may be referred to as the primary subsystem. The evaporative-emission system also includes an auxiliary subsystem 150 that enables the canister 52 to absorb fuel vapors of a fuel source external to the vehicle 20. For example, the auxiliary subsystem 150 is configured to connect with an external fuel-storage device 152. The auxiliary subsystem 150 includes an auxiliary port 154 that is connected in fluid communication with the canister 52 via a valve 156 and conduit 157. The valve 156 includes an inlet that connects to the auxiliary port 154 and an outlet that connects to the conduit 54 connecting between the valve 94 and the canister 52. The auxiliary subsystem 150 may be connected to the main subsystem by a tee fitting 160. The valve 156 may be an electronically controlled valve or may be a mechanically operated valve.

The auxiliary port 154 is configured to connect with an external hose 162. For example, the auxiliary port 154 may include a male or female hose fitting 164 that is configured to connect with a mating female or male hose fitting 166 associated with the external hose 162. The hose fittings may be quick-connect hose fittings allowing the external hose 162 to be quickly connected and disconnected from the vehicle 20. Any of the known types of hose fittings may be used.

The external fuel-storage device 152 may be a gasoline canister, such as a five-gallon canister typically used to refuel recreational vehicles, lawn equipment, marine vessels, and the like. The storage device 152 may include a vent 170. Historically, the vent 170 simply released evaporative emissions of the fuel to the atmosphere. The auxiliary subsystem 150 is configured to capture these fuel vapors to reduce air pollution. The hose 162 may include another fitting 172 configured to attached to the vent 170. The hose 162 is configured to carry the fuel vapors from the fuel-storage device 152 to the auxiliary port 154. The conduit 157 then carries these vapors from the fuel-storage device 152 to the canister 52 through the open valve 156. Use cases for the auxiliary subsystem 150 include capturing fuel vapors during filling of the fuel-storage device 152 and for capturing hot-soak vapors of the storage device 152.

The vehicle includes a controller 178. While illustrated as one controller, the controller 178 may be part of a larger control system and may be controlled by various other controllers throughout the vehicle 20, such as a vehicle system controller (VSC). It should therefore be understood that the controller 178 and one or more other controllers can collectively be referred to as a "controller" that controls various actuators in response to signals from various sensors to control functions such as the engine, the fuel system, the evaporative-emissions system, and others. Controller 178 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 178 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 178 within each of the subsystems identified above.

Figure 2:
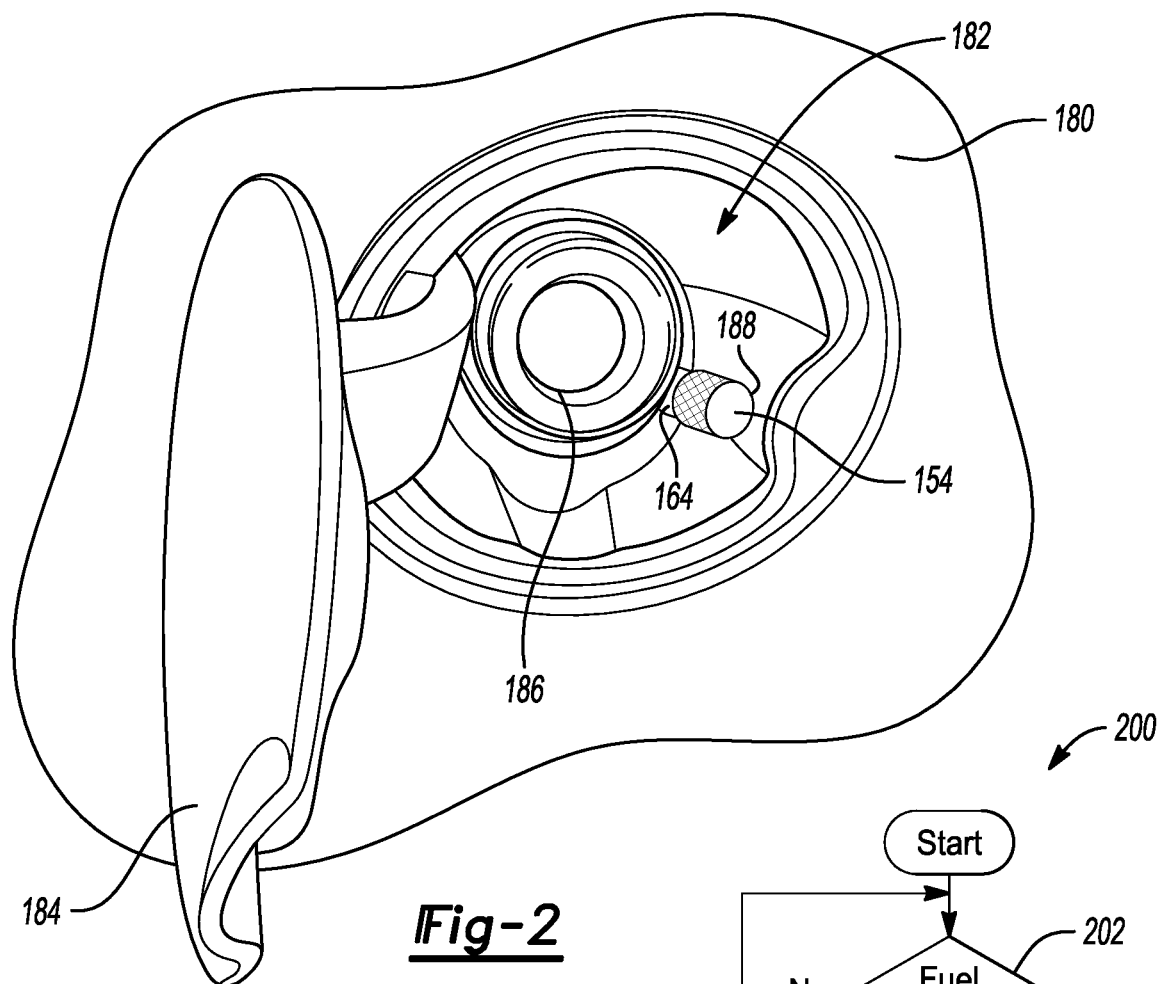
FIG. 2 is a perspective view of a refueling compartment with the door in the open position.

Referring to FIG. 2, the vehicle 20 includes a body 180 having a plurality of external panels forming the class-A surface of the vehicle. A refueling compartment 182 is recessed into the body. The refueling compartment 182 is hidden behind a fuel door 184 that is pivotally attached to the body 180 and is configured to be flush with the exterior panels when closed. When the door 184 is open, the refueling compartment 182 is accessible to refuel the vehicle. The compartment 182 includes the fuel port 186 of the filler system 70 that is configured to receive the nozzle of the fuel pump. In one or more embodiments, the auxiliary port 154 is located within the refueling compartment 182 and is disposed adjacent to the fuel port 186. The hose fitting 164 may be supported in a plastic liner of the fueling compartment 182 with an end portion of it extending therefrom. A cap 188 may be provided to prevent contamination of the hose fitting 164. The cap 188 may be threaded or otherwise attached to the hose fitting 164.

Control logic or functions performed by controller 178 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 178. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
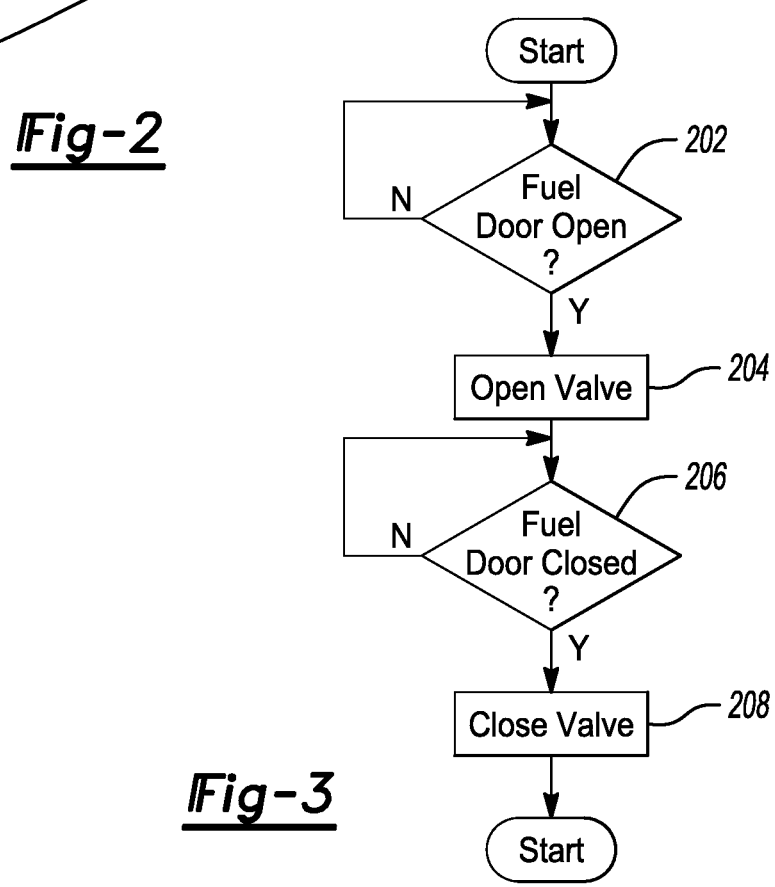
FIG. 3 is a flow chart of an algorithm FOR operating an auxiliary subsystem of the evaporative-emissions system.

FIG. 3 is a flowchart 200 of an algorithm for controlling the evaporative-emissions system of the embodiment(s) shown in FIGS. 1 and 2. In this embodiment, the auxiliary port is disposed under the fuel door, and consequently, movement of the fuel door is used to trigger opening/closing of the valve associated with the auxiliary subsystem. At operation 202, the controller determines if the fuel door is open. The fuel door may include an associated sensor that is configured to sense the position of the fuel door. If the fuel door is open, control passes operation 204. At operation 204, the valve, e.g., the valve 156, is opened. In some embodiments, the valve may be an electronically controlled valve. Here, the controller may send a signal to a solenoid or other actuator commanding the valve to the open position. In other embodiments, the valve may be a mechanically actuated valve that is manually operated by opening the fuel door. For example, a linkage, a cable, or other drive mechanism may be interconnected between the valve and the fuel door. This mechanical connection is configured to actuate the valve between opened and closed positions when the fuel door is pivoted open and close. When the valve is open, the auxiliary port is in fluid communication with the canister. This allows the user to connect an external fuel-storage device to the canister and collect evaporator emissions. In operation 206, the controller determines if the fuel door is closed. If no, the valve remains in the open position. If yes, the valve is closed at operation 208.

FIG. 3 is but one example controls for opening and closing the auxiliary valve. In other embodiments, the vehicle may include a button, a switch, a capacitive-touch icon, or the like for opening and closing the valve.

Figure 4:
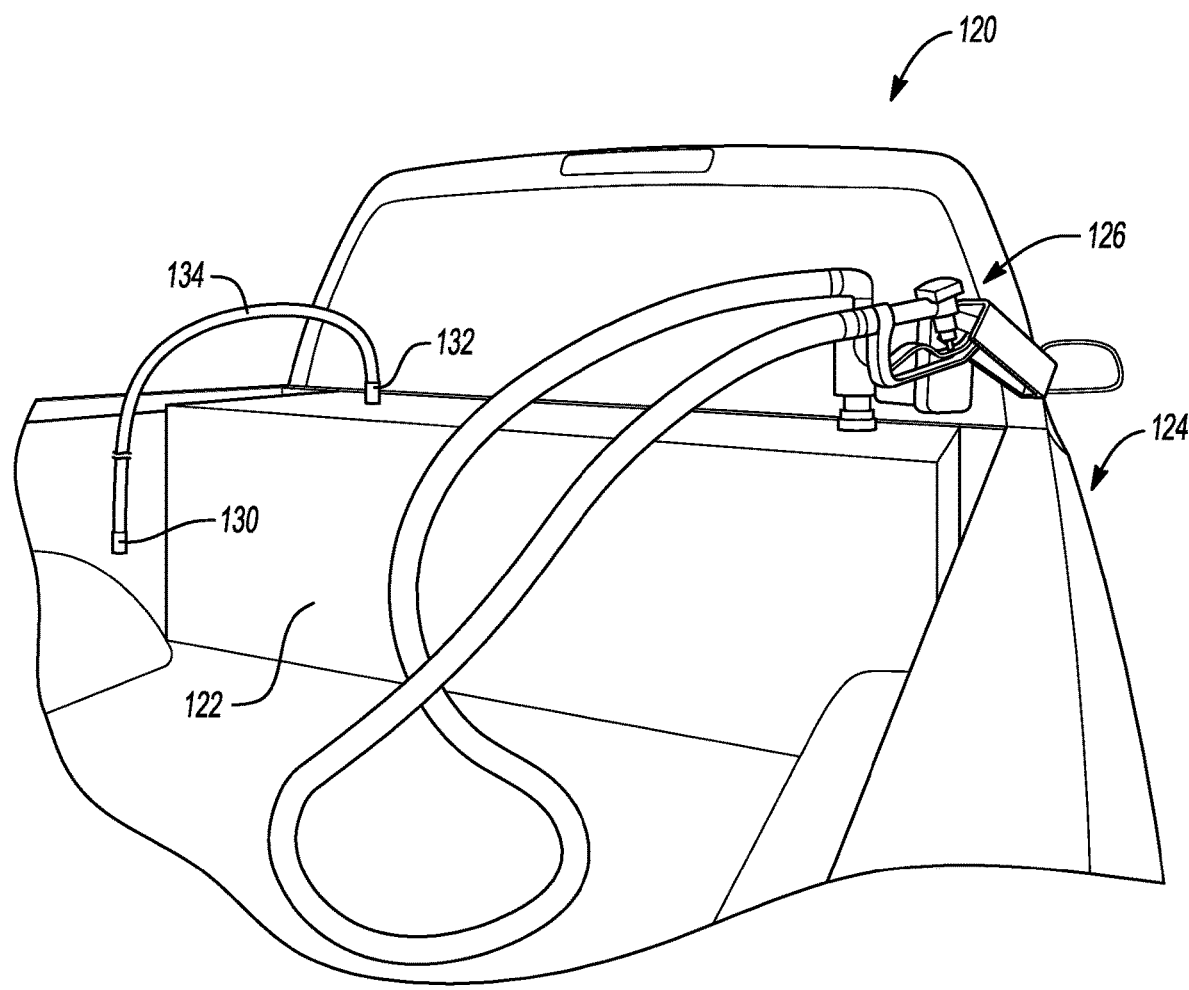
FIG. 4 is a perspective view of a vehicle having an external fuel-storage device mounted in a bed of the vehicle.

FIG. 4 depicts another vehicle 120 having a large external fuel-storage tank 122. The vehicle 120 may be a pickup truck having a bed 124. The fuel-storage tank 122 may be received in the front of the bed. The vehicle 120 may be a work truck that is configured to re-fuel equipment, such as construction equipment or the like. The fuel-storage tank 122 may include refueling equipment 126 such as a pump, a nozzle, and hosing. Traditionally, the fuel storage tank would include a valve or vent that vented fuel vapors to the atmosphere. To reduce evaporative emissions, the vehicle 120 connects the fuel tank 122 to the evaporative-emission system of the vehicle 120. The vehicle 120 may include a similar or same evaporator-emissions system as shown in FIG. 1. As shown in FIG. 4, the vehicle 120 includes a port 130 disposed on a sidewall of the truck bed. The port 130 is connected to a vent 132 of the fuel tank 122 by a hose 134. In the vehicle 120, fuel vapors within the fuel-storage tank 122 are collected by the canister of the evaporator-emission system via the auxiliary subsystem.

The auxiliary subsystem may include a valve, e.g. valve 156, disposed between the port 130 and the canister. When the valve is open, the fuel-storage tank 122 is in fluid communication with the canister to trap evaporative emissions. This valve may be an electronically operated valve. This valve may be operated by the controller 178 based on a plurality of sensed conditions. For example, the vehicle 120 may include a pressure sensor configured to detect a vapor pressure at the port 130 or within the fuel tank 122. In response to the pressure sensor indicating an elevated vapor pressure, the controller may command the valve open to allow evaporative emissions to be captured by the canister. In another embodiment, the valve may be periodically opened based on a timer to periodically purge the fuel tank 122.

The auxiliary subsystem allows for the capture of fuel vapors from external fuel-storage devices to reduce hydrocarbon emissions. The system also allows for the continuous venting of vehicle-mounted external fuel-storage devices preventing excessive internal pressures that may warp, stretch, or deform the fuel-storage devices.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a fuel tank; and
   an evaporative-emissions system including:
      a primary subsystem including a fuel-vapor canister in fluid communication with the fuel tank to capture fuel vapors of the fuel tank, and
      an auxiliary subsystem configured to capture fuel vapors associated with an external fuel-storage device, the auxiliary subsystem including an auxiliary port located on an exterior of the vehicle and configured to connect with the external fuel-storage device, the auxiliary port being selectively connected in fluid communication with the fuel-vapor canister by a valve.

2. The vehicle of claim 1, wherein the primary subsystem further includes a vent line connecting the fuel-vapor canister in fluid communication with air outside of the vehicle.

3. The vehicle of claim 1, wherein the auxiliary port includes a hose fitting configured to connect with a hose associated with the external fuel-storage device.

4. The vehicle of claim 1 further comprising a refueling compartment including a fuel port in fluid communication with the fuel tank and a fuel door pivotal to open and close the refueling compartment.

5. The vehicle of claim 4, wherein the auxiliary port is disposed in the refueling compartment.

6. The vehicle of claim 5, wherein the valve is configured to open in response to the fuel door being opened and is configured to close in response to the fuel door being closed.

7. The vehicle of claim 1, wherein the primary subsystem further includes a second valve that selectively connects the fuel tank and the fuel-vapor canister in fluid communication, the second valve having an outlet fluidly connected to the fuel-vapor canister by conduit, wherein an outlet of the valve of the auxiliary subsystem is connected in fluid communication with the conduit.

8. The vehicle of claim 7, wherein the primary subsystem further includes a vent line having a third valve that selectively connects the fuel-vapor canister in fluid communication with air outside of the vehicle.

9. The vehicle of claim 1 further comprising:
   a fuel door; and
   a controller in electric communication with the valve and programmed to:
      in response to the fuel door being opened, command the valve to an open position, and
      in response to the fuel door being closed, command the valve to a closed position.

10. The vehicle of claim 1 further comprising:
    an engine including an intake manifold connected in fluid communication with the fuel-vapor canister.

11. A vehicle comprising:
    an engine including an intake manifold;
    a fuel-vapor canister configured to store fuel vapors;
    a purge line connecting the canister in fluid communication with the intake manifold;
    a vent line connecting the canister in fluid communication with the atmosphere;
    an auxiliary port configured to connect to an external fuel-storage device; and
    an auxiliary line connecting the auxiliary port in fluid communication with the canister and including an associated valve having a first position in which the auxiliary line is open to connect the port to the canister and a second position in which the auxiliary line is closed to sever fluid communication between the port and the canister.

12. The vehicle of claim 11 further comprising a controller programmed to:
    command the valve to the first position to connect the canister and the port in fluid communication in response to a first condition, and
    command the valve to the second position to sever fluid communication between the canister and the port in response to a second condition.

13. The vehicle of claim 12, wherein the first condition includes a fuel door being open, and the second condition includes a fuel door being closed.

14. The vehicle of claim 13, wherein the auxiliary port is disposed in a compartment associated with the fuel door.

15. The vehicle of claim 11 further comprising a refueling compartment including a fuel port in fluid communication with a fuel tank and a fuel door pivotal to open and close the refueling compartment, wherein the auxiliary port is disposed in the refueling compartment.

16. The vehicle of claim 15, wherein the valve is configured to be in the first position when the fuel door is open and in the second position when the fuel door is closed.

17. The vehicle of claim 11, wherein the auxiliary port includes a hose fitting configured to connect with a hose associated with the external fuel-storage device.

18. An evaporative-emissions system of a vehicle comprising:
    a fuel-vapor canister configured to store fuel vapors, the fuel-vapor canister being selectively connected in fluid communication with an engine intake manifold by a purge line and being selectively connected in fluid communication with the atmosphere by a vent line; and
    an auxiliary port configured to connect to an external fuel-storage device, the auxiliary port being selectively connected in fluid communication with the fuel-vapor canister by a valve.

19. The evaporative emission system of claim 18 further comprising a cover movable to provide access to the auxiliary port, wherein the valve is configured to be open when the cover is open and is configured to be closed when the cover is closed.

20. The evaporative emission system of claim 18, wherein the auxiliary port includes a hose fitting configured to connect with a hose associated with the external fuel-storage device.

\* \* \* \* \*